United States Patent
Lutz et al.

(10) Patent No.: US 7,615,595 B2
(45) Date of Patent: Nov. 10, 2009

(54) ADHESIVE OF EPOXY RESIN, DIENE COPOLYMER-MODIFIED EPOXY RESIN, PHENOLIC-TERMINATED ELASTOMERIC TOUGHENER AND POLYESTER SEGMENT POLYMER

(75) Inventors: Andreas Lutz, Altendorf (CH); Jeannine Flueckiger, Pfaffikon (CH); Karsten Frick, Birmenstorf (CH)

(73) Assignee: Dow Global Technologies, Inc., Midland, MI (US)

( * ) Notice: Subject to any disclaimer, the term of this patent is extended or adjusted under 35 U.S.C. 154(b) by 530 days.

(21) Appl. No.: 11/597,978

(22) PCT Filed: May 27, 2005

(86) PCT No.: PCT/EP2005/005731

§ 371 (c)(1),
(2), (4) Date: Jan. 9, 2007

(87) PCT Pub. No.: WO2005/118734

PCT Pub. Date: Dec. 15, 2005

(65) Prior Publication Data

US 2008/0045670 A1     Feb. 21, 2008

(30) Foreign Application Priority Data

Jun. 1, 2004   (EP) ................................. 04012885

(51) Int. Cl.
*C08L 63/00* (2006.01)
*C08L 63/02* (2006.01)

(52) U.S. Cl. ....................................... 525/109; 525/438

(58) Field of Classification Search ....................... None
See application file for complete search history.

(56) References Cited

U.S. PATENT DOCUMENTS

| 4,659,779 | A | 4/1987 | Bagga et al. |
| 7,511,097 | B2 * | 3/2009 | Frick et al. ................... 525/113 |
| 7,557,168 | B2 * | 7/2009 | Lutz et al. ................... 525/454 |
| 2006/0276601 | A1 | 12/2006 | Lutz et al. |

FOREIGN PATENT DOCUMENTS

| WO | WO 03/054069 | 7/2003 |
| WO | WO 2005/007766 | 1/2005 |

OTHER PUBLICATIONS

Database WPI Section Ch, Week, 199121, Derwent Publications Ltd., London, GB; Class A21, AN 1991-151142, XP002307834 & JP 03043481 Raytheon Co., Feb. 25, 1991- Abstract.
JP2011616A, Jan. 16, 1990, Manufacture of Composition of Butadiene-Based Copolymer and Terminal Urethane Polymer and Bridging Product Thereof, Rorufu Miyuruhauputo et al., This is a family member of EP0338985, Abstract.

* cited by examiner

*Primary Examiner*—Robert Sellers

(57) ABSTRACT

The present invention relates to an epoxy adhesive composition comprising
a) a first epoxy resin,
b) a second epoxy resin modified with a copolymer based on a 1,3-diene and a polar, ethylenically unsaturated comonomer,
c) a toughener and
d) a polymer comprising a polyester segment, said polymer being at least partially crystalline at room temperature and having a softening temperature in the range of 40° to 125° C.

The invention further relates to the use of such an epoxy adhesive composition for bonding parts of a vehicle without prehardening of the epoxy adhesive composition and to a vehicle, parts of which are bonded by the epoxy adhesive composition.

14 Claims, No Drawings

ADHESIVE OF EPOXY RESIN, DIENE COPOLYMER-MODIFIED EPOXY RESIN, PHENOLIC-TERMINATED ELASTOMERIC TOUGHENER AND POLYESTER SEGMENT POLYMER

The present invention relates to a toughened epoxy adhesive composition containing a polyester, the use of the toughened epoxy adhesive composition for bonding parts of a vehicle and a vehicle having parts bonded using the toughened epoxy adhesive composition.

Epoxy adhesive compositions are reaction adhesive compositions comprising an epoxy resin, a curing agent and usually an accelerator. Upon heat-activation, the epoxy groups of the epoxy resin react with the curing agent linking the epoxy resin compounds by a polyaddition reaction to obtain a cured product.

Such a cured product is known to have good mechanical properties and a corrosion resistance superior to the cured product of other reaction adhesives. These characteristics make epoxy adhesive compositions particularly useful for demanding applications where stringent mechanical requirements must be satisfied, for example in the automotive industry. Adhesives for bonding parts of the body structure of a vehicle, for example, a car, a lorry (truck), a bus or a train, are called structural adhesives.

Structural epoxy adhesives based on the technology described in EP-A-0 308 664 and in EP-A-0 353 190 are highly suitable for bonding parts of a vehicle due to the excellent static and dynamic strength of their cured products.

In the manufacturing process of a vehicle, the body-in-white structure to which the structural adhesive has been applied is subjected to spray wash or other cleaning followed by phosphatizing and e-coating prior to the final curing of the structural adhesive in the e-coat oven. In order to prevent the structural adhesive from being washed off, it is conventionally prehardened by thermal methods such as inductive precuring or by using a body-in-white oven.

However, such an additional precuring step makes the manufacturing process laborious. Additionally, body-in-white ovens are very expensive.

To circumvent the prehardening in a body-in-white oven or by induction, one option is to add solid epoxy resins to the structural adhesive composition, thereby providing a structural adhesive having a high basic viscosity. Although such a structural adhesive has a certain wash-off resistance, it is difficult to apply. For its application, a fully heated application equipment is necessary. In particular, its use in high volume applications, which require high application speeds, is limited.

Several structural epoxy adhesives and other curable epoxy resin based compositions are known in the art.

EP-A-0 270 914 relates to a structural adhesive comprising an epoxy-group containing material, a thermoplastic polyester and a curing agent. The problem described in this application is to reduce shrinkage during curing of the structural adhesive.

WO 03/054069 relates to a thermosettable composition comprising a liquid epoxy resin, a thermoplastic polymer powder, a blowing agent, a curative and a filler. This thermosettable composition foams and cures at a relatively low temperature.

U.S. Pat. No. 5,194,502 describes a structural epoxy adhesive which comprises a polyester resin having carboxyl groups at its termini. Although the structural adhesive of U.S. Pat. No. 5,194,502 has a relatively good wash-off resistance, the dynamic strength after curing is relatively poor. It does therefore not fully comply with the safety requirements in terms of the crash resistance of a vehicle.

The object of the present invention is to provide an epoxy adhesive composition, which has a rather low basic viscosity at application temperature and, without being precured, a high wash-off resistance. Said epoxy adhesive composition results in a cured product having a high static and dynamic strength and a good corrosion resistance.

SUMMARY OF INVENTION

The epoxy adhesive composition of the present invention comprises
a) a first epoxy resin,
b) a second epoxy resin modified with a copolymer based on a 1,3-diene and a polar, ethylenically unsaturated comonomer,
c) a toughener selected from the group consisting of compounds of formula I

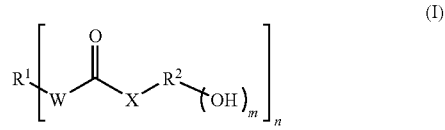

wherein m is 1 or 2, n is 2 to 6, $R^1$ is an n-valent radical of an elastomeric prepolymer after the removal of the terminal isocyanate, amino or hydroxyl group, the elastomeric prepolymer being soluble or dispersible in epoxy resin, W and X are independently —O— or —$NR^3$—, at least one of W and X being —$NR^3$—, $R^2$ is an m+1-valent radical of a polyphenol or aminophenol after the removal of the phenolic hydroxyl group and optionally of the amino group, and $R^3$ is hydrogen, a $C_1$ to $C_6$ alkyl or phenol,
and compounds of formula II

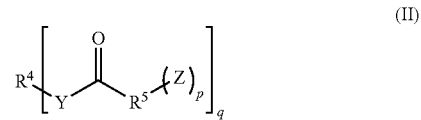

wherein p is 1 or 2, q is 2 to 6, Y is —O—, —S— or —$NR^6$, Z is a radical selected from the group consisting of —OH, —$NHR^6$, —OCN,

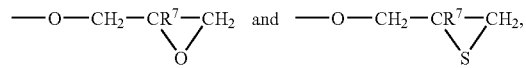

$R^4$ is a residue of a hydroxyl-, mercapto- or amino-terminated polyether prepolymer or of a hydroxyl-, mercapto- or amino-terminated prepolymeric, segmented polyester, polythioester or polyamide, $R^5$ is a carbocyclic aromatic or araliphatic p+1-valent radical with groups Z bonded directly to the aromatic ring, $R^6$ is hydrogen, $C_1$ to $C_6$ alkyl or phenyl, and $R^7$ is methyl or hydrogen, and mixtures thereof and
d) a polymer comprising a polyester segment, said polymer being at least partially crystalline at room temperature and having a softening temperature in the range of 40° to 125° C.

The epoxy adhesive composition of the present invention is heated at a temperature of 40° to 65° C. before application. Due to its low viscosity under application conditions, the epoxy adhesive composition can even be used in high volume applications, which require high application speeds.

At application temperatures, compound d) softens and re-thickens by partial crystallization when cooled down after the application, leading to a structural adhesive having a high viscosity at low shear strains and a higher thixotropy compared to structural adhesives known in the art. At a low shear strain of about 0.001, the solidified epoxy adhesive composition has a high viscosity of more than 19,000 Pas. Due to this high viscosity at low shear strains, the epoxy adhesive composition has a high wash-off resistance without being prehardened.

The epoxy adhesive composition of the present invention shows all the requested properties of excellent structural adhesives such as a good corrosion resistance, high mechanical strength and a high crash resistance. Thus, an epoxy adhesive composition has a lap shear strength of 20 to 30 MPa, an impact peel value of more than 35 N/mm at room temperature, a tensile strength of about 30 MPa, a young modulus of about 1,500 and a tensile elongation at break of more than 10 percent.

Generally, the cured epoxy adhesive composition tends to a more obvious cohesive bonding failure mode in mechanical testing than the structural adhesives based on the technology described in EP-A-0 308 664 and in EP-A-0 353 190. Additionally, the oil absorption is improved over that referenced state of the art.

DETAILED DESCRIPTION OF INVENTION

Component d) can be a polyester or a copolymer comprising a polyester segment, such as a polyurethane polyester copolymer or an epoxy resin comprising a polyester segment. Preferably, the epoxy adhesive composition comprises as component d) a polyester. The term "polyester" includes any end-functionalized polyester, such as a hydroxyl-group terminated or a carboxyl-group terminated polyester as well as hydroxyl- or carboxyl-group terminated polyesters which have further been reacted, for example, with epichlorohydrin. The term "polyester" also includes polyesters based on a cyclic ester, such as polycaprolactone.

In a preferred embodiment, the epoxy adhesive composition comprises 5 to 25 weight percent, more preferably 5 to 15 weight percent of component d). Component d) preferably comprises at least one polymer selected from the group consisting of a hydroxyl-group terminated polyester, a carboxyl-group terminated polyester and an epoxy polyester resin. Hydroxyl-group terminated polyesters do not react with the epoxy groups of the epoxy resin at application temperature. In such an embodiment, component d) does not interfere with the rheological and mechanical properties of the other components of the composition or their mixture. The viscosity increase, i.e., the re-thickening by partial crystallization of the adhesive composition of the present invention is almost fully reversible by heating.

In a preferred embodiment, component d) has a softening temperature in the range of 40° to 90° C. Examples of such a component d) are polyesters of the DYNACOLL® 7,000 series (Degussa). Particularly good results are achieved if component d) has a molecular weight in the range of 2,000 to 5,000 g/mol, preferably in the range of 3,000 to 4,000 g/mol, most preferably of about 3,500 g/mol. Examples of such a component d) are the polyesters DYNACOLL® 7330 and DYNACOLL® 7381 polyesters.

In a further embodiment, component a) comprises a mixture of at least two different epoxy resins, such as D.E.R.® 330 and D.E.R.® 331 epoxy resins (The Dow Chemical Company). Generally, at least one epoxy resin is a liquid epoxy resin. If desired for a specific field of application, the basic viscosity of the epoxy adhesive composition can be increased by adding at least one epoxy resin which is solid at room temperature, such as D.E.R.® 671 epoxy resin (The Dow Chemical Company).

The epoxy resin used in the invention is used in a sufficient amount to give the desired adhesive and strength properties. Preferably, the epoxy resin is used in an amount of 30 to 80 parts, more preferably 40 to 70 parts, and most preferably 50 to 60 parts per hundred parts of the adhesive composition.

Preferred epoxy adhesive compositions comprise 5 to 30 weight percent, more preferably 10 to 20 weight percent of component b). Component b) is an epoxy resin modified by a copolymer of a 1,3-diene and a polar ethylenically unsaturated monomer. The term "modified" means herein that the copolymer is blended with, grafted to or reacted with the epoxy resin, i.e., an adduct. Preferably, the copolymer is an adduct to the epoxy resin. Such copolymers are described in detail in U.S. Pat. No. 5,278,257 at column 2, line 11, to column 4, line 5, the disclosure of which is incorporated herein by reference. Examples of 1,3-dienes for the preparation of component b) are butadiene, isoprene and chloroprene. Copolymers based on butadiene are preferred. Examples of polar, ethylenically unsaturated comonomers used in the copolymer are acrylic acid, methacrylic acid, esters of acrylic or methacrylic acid, for example, the methyl or ethyl esters, amides of acrylic or methacrylic acid, fumaric acid, itaconic acid, maleic acid or esters or half-esters thereof, for example, the monomethyl or dimethyl esters, or maleic anhydride or itaconic anhydride; vinyl esters, for example, vinyl acetate, polar styrenes, such as styrenes chlorinated or brominated in the nucleus, or, in particular, acrylonitrile or methacrylonitrile. Besides polar, ethylenically unsaturated comonomers, the copolymer can also contain other non-polar, ethylenically unsaturated comonomers. Examples of these are ethylene, propylene or, in particular, styrene or substituted styrenes, such as vinyltoluene. Component b) can be a statistical copolymer, a block copolymer or a graft copolymer. This component can be solid, in particular pulverulent, or, preferably, can be liquid. It can also be a thermoplastic, a thermoplastic elastomer or an elastomer. The proportion of the comonomers in the copolymer can vary within wide ranges. The monomers are chosen that an elastomer phase is formed in combination with an epoxide resin a). These can be homogeneous or heterogeneous system.

It is particularly preferred that component b) comprises an epoxy resin modified with an acrylonitrile-butadiene rubber. Preferably, component b) comprises at least one of the acrylonitrile-butadiene rubbers selected from the group of X13, X8, X31 or any mixture of X8, X31 and X13 (wherein X stands for an acrylonitrile-butadiene rubber of the CTBN (carboxy-terminated butadiene-rubber) type and the term "mixture" means a "mixture of two or three of the components").

X8 is an acrylonitrile-butadiene-rubber comprising 17 percent acrylonitrile.

X13 is an acrylonitrile-butadiene-rubber comprising 26 percent acrylonitrile.

X31 is an acrylonitrile-butadiene-rubber comprising 10 percent acrylonitrile.

In a further preferred embodiment, the composition comprises 10 to 20 weight percent of component c).

Component c) can comprise a mixture of both a toughener of formula I and a toughener of formula II.

A detailed description of the toughener of formula I is given in EP-A-0 308 664 (page 5, line 14, to page 13, line 24), the disclosure of which is incorporated herein by reference.

A detailed description of the toughener of formula II is given in EP-A-0 353 190 (page 3, line 51, to page 6, line 62), the disclosure of which is incorporated herein by reference.

An example of component c) is FLEXIBILIZER® DY 965 (available from Huntsman prepared according to Example 16 of U.S. Pat. No. 5,278,257). Other examples of component c) are RAM A, FLEXIBILIZER® DY 3333 or RAM C, RAM A, FLEXIBILIZER® DY 3333 and RAM C are compounds of formula I, RAM A being allylphenol-terminated, FLEXIBILIZER® DY 3333 being bisphenol A-terminated and RAM C being alkylphenol-terminated. RAM A and RAM C are described in WO 2005/007766.

The epoxy adhesive composition according to the present invention can further include additives, such as fillers and accelerators, which are known to a person skilled in the art.

In a preferred embodiment, the composition comprises as an accelerator a solid solution of a nitrogen base having a boiling point above 130° C. in a phenolic polymer which is an addition polymer of a phenol having an unsaturated substituent. (The term "solid solution" means the combination of the components in a solid one-phase system). A detailed description of such an accelerator is given in EP-A-0 197 892 (page 7, line 7, to page 10, line 28), the disclosure of which is also incorporated herein by reference. Among these accelerators, EP 796, i.e., 2,4,6-tris(dimethylaminomethyl)phenol integrated into a poly(p-vinylphenol) matrix, which is known to a skilled person and which is also described in EP-A-0 197 892, is particularly preferred. The composition can comprise a catalyst which catalyzes the reaction of isocyanate moieties with water or an active hydrogen containing compound. Such compounds are well known in the art. The catalyst can be any catalyst known to the skilled artisan for the reaction of isocyanate moieties with water or active hydrogen containing compounds. Among preferred catalysts are organotin compounds, metal alkanoates, and tertiary amines, such as dimorpholinodialkyl ethers. Included in the useful catalysts are organotin compounds such as alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. The dialkyltin dicarboxylate preferably corresponds to the formula $(R^5OC(O))_2-Sn-(R^5)_2$ wherein $R^5$ is independently in each occurrence a $C_{1-10}$ alkyl, preferably a $C_{1-3}$ alkyl and most preferably a methyl. Dialkyl tin dicarboxylates with lower total carbon atoms are preferred as they are more active catalysts in the compositions of the invention. The preferred dialkyl dicarboxylates include 1,1-dimethyltin dilaurate, 1,1-dibutyltin diacetate and 1,1-dimethyl dimaleate. The organo tin catalyst is present in an amount of about 60 parts per million or greater based on the weight of the composition, more preferably 120 parts by million or greater. The organo tin catalyst is present in an amount of about 1.0 percent or less based on the weight of the composition, more preferably 0.5 percent by weight or less and most preferably 0.1 percent by weight or less. Other useful catalysts include tertiary amines such as, dimorpholinodialkyl ether, a di((dialkylmorpholino) alkyl)ether, bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methylmorpholine, N-ethyl morpholine and mixtures thereof and metal alkanoates, such as bismuth octoate or bismuth neodecanoate. A preferred dimorpholinodialkyl ether is dimorpholinodiethyl ether. A preferred di((dialkylmorpholino)alkyl)ether is (di-(2-(3,5-dimethylmorpholino)ethyl)ether). Tertiary amines, such as dimorpholinodialkyl ether or di((dialkylmorpholino)alkyl) ether, are preferably employed in an amount, based on the weight of the composition, of about 0.01 percent by weight or greater, more preferably about 0.05 percent by weight or greater, even more preferably about 0.1 percent by weight or greater and most preferably about 0.2 percent by weight or greater and about 2.0 percent by weight or less, more preferably about 1.75 percent by weight or less, even more preferably about 1.0 percent by weight or less and most preferably about 0.4 percent by weight or less.

If desired for a specific field of application, the basic viscosity of the epoxy adhesive composition can be increased by adding a gelling agent, according to a further preferred embodiment. A gelling agent is a polymer which gels when heated to temperatures of 100 to 130° C. so as to decrease the viscosity of the composition. Gelling agents are well known to a person skilled in the art and include polyacrylates, polyvinylbutyrates, polyvinyl chlorides. Preferred gelling agents are polyvinyl butyrates.

The epoxy adhesive composition is preferably used for the assembly of parts of a vehicle, such as a car, a van, a lorry (truck), a bus and a train, i.e., as structural adhesive. It can also be used for assembling parts of boats and aircrafts.

The epoxy adhesive composition of the present invention can be applied manually or automatically by a robot as normal beads, by swirling or by jet-streaming. The curing is starting at temperatures above 140° C.

EXAMPLES

Preparation of Polyester Epoxy Resin 40 weight percent of a carboxy-terminated polyester (DYNACOLL® 7330 AC 28 of Degussa) and 60 weight percent D.E.R.® 330 epoxy resin (The Dow Chemical Company) are heated under agitation to 130° C. in a laboratory planetary mixer to homogeneity. Then, triphenylphosphine (TPP) is added and the mixture is stirred for additional 4 hours at 130° C. The acid number was determined as being lower than 0.1 mg KOH/g.

Preparation of Premixes

Premix 1:

20 weight percent DYNACOLL® 7381 polyester (Degussa) and 80 weight percent D.E.R.® 330 epoxy resin (The Dow Chemical Company) are heated to 100° C. in an oven and are mixed in a laboratory planetary mixer for 10 minutes. Then, the mixture is allowed to cool down to room temperature.

Premix 2:

Premix 2 was prepared similarly to Premix 1 but using 30 weight percent DYNACOLL® 7381 polyester and 70 weight percent D.E.R.® 330 epoxy resin.

Premix 3:

Premix 3 was prepared similarly to Premix 1 but using DYNACOLL® 7330 polyester.

Premix 4:

Premix 4 was prepared similarly to Premix 1 but using DYNACOLL® 7330 AC 28 carboxy-terminated polyester.

Premix 5:

Premix 5 was prepared similarly to Premix 1 but using DYNACOLL® 7381 AC 28 carboxy-terminated polyester.

Premix 6:

Premix 6 was prepared similarly to Premix 1 but using 50 weight percent polyester epoxy resin as prepared above and 50 weight percent D.E.R.® 330 epoxy resin.

Preparation of Epoxy Adhesive Compositions 24 weight percent of D.E.R.® 330 or 331 epoxy resin, 30 weight percent of one of the above premixes (Premix 1 for BM 1460.005, Premix 2 for BM 1460.010, Premix 3 for BM 1460.014, Premix 4 for BM 1460.025, Premix 5 for BM 1460.026, Premix 6 for BM 1460.029), 18 weight percent of a toughener (FLEXIBILIZER® DY 3333; Huntsman), 12 weight percent of a rubber-modified epoxy resin (STRUKTOL® 3611; Schill & Seilacher), 0.7 weight percent of glycidyloxypropyltrimethoxysilane (Huntsman) and 0.8 weight percent of colorant are mixed in a laboratory planetary mixer at 70° C. for 30 minutes.

a) BM 1460.005:

For the preparation of BM 1460.005, 8 weight percent fumed silica (AEROSIL®; Degussa) are added to the above mixture at room temperature for 15 minutes. Then, 5 weight percent DICY® (Cyanoguanidine, Airproducts), 0.5 weight percent of accelerator EP 796 (Huntsman) and 3 weight percent of a gelling agent are admixed at room temperature for 15 minutes.

b) BM 1460.010:

For the preparation of BM 1460.010, 8 weight percent fumed silica (AEROSIL®; Degussa) are added to the above mixture at room temperature for 15 minutes.

Then, 5 weight percent DICY® (Cyanoguanidine, Airproducts) and 0.5 weight percent of accelerator EP 796 (Huntsman) are admixed at room temperature for 15 minutes.

c) BM 1460.014:

For the preparation of BM 1460.014, 10 weight percent fumed silica (AEROSIL®; Degussa) are added to the above mixture at room temperature for 15 minutes. Then, 5 weight percent DICY® (Cyanoguanidine, Airproducts) and 0.5 weight percent of accelerator EP 796 (Huntsman) are admixed at room temperature for 15 minutes.

d) BM 1460.025, BM 1460.026 and BM 1460.029 are prepared as described under a) by using the corresponding mixture.

All other compositions mentioned in the Tables have been prepared in a similar fashion.

All mixing steps are performed under vacuum or nitrogen.

Adhesive Testing

The adhesive BM 1460.010 (10 percent DYNACOLL® in the adhesive formulation) shows the following bulk standard values after being cured at 180° C. for 30 minutes. The values given below were determined according to DIN EN ISO 527-1.

E-modulus: about 1,200 MPa

Tensile strength: about 30 MPa

Elongation: about 15 percent

Glass transition temperature (DSC): about 95° C.

The other adhesive compositions according to the present invention as mentioned above show similar mechanical and physical characteristics.

Testing Methods

The lap shear strength was tested at 23° C. according to EN 1465, using a cold-rolled steel (CRS) 1403 (1.5 mm thick), hot-dipped zinc-coated steel (0.8 mm thick) and aluminum 6130 (1.3 mm thick), both known to a skilled person. The aluminum was pre-treated using ALODINE® 2040 (Henkel). The bonding area was 25 mm×10 mm. The layer thickness was 0.2 mm. The test speed was 10 mm/min.

The impact peel strength was tested at 23° C. according to ISO 11343, using a cold-rolled steel (CRS) 1403 (1.0 mm thick). The impact peel strength was measured at 2 n/s. The bonding area was 30 mm×20 mm. The layer thickness was 0.2 mm.

The steels used for the tests were degreased.

The rheology was measured on a Bohlin rheometer, cone (4°)–plate, gap=150 μm. The shear rate was varied from 0.1 $s^{-1}$ to 20 $s^{-1}$ (up and down).

TABLE 1

Viscosity and yield stress was measured on a Bohlin rheometer at 45° C. and calculated according to Casson.

| Sample | Viscosity [Pas] | Yield stress [Pa] |
| --- | --- | --- |
| BM 1460.005 (5% DYNACOLL ® 7381) | 63 | 420 |
| BM 1460.010 (10% DYNACOLL ® 7381) | 36 | 530 |
| BM 1460.011 (5% DYNACOLL ® 7330) | 60 | 463 |
| BM 1460.014 (5% DYNACOLL ® 7330) | 50 | 850 |
| BM 1460.025 (5% DYNACOLL ® 7330 AC 28) | 58 | 570 |
| BM 1460.026 (5% DYNACOLL ® 7381 AC 28) | 43 | 364 |
| BM 1460.029 | 69 | 420 |
| BM 1460.002 (TONE ® 1278) | 20 | 54 |
| BM 1480.086 (3% DEGALAN ® 4899F) | 33 | 293 |
| BM 1480 (comparative) | 53 | 370 |
| BM 1496V (comparative) | 330 | 60 |

The thermoplastic polymers (component d) in the above samples are specified as follows:

DYNACOLL® 7381 is a polyester polyol with a softening temperature of about 67° C.

DYNACOLL® 7330 is a polyester polyol with a softening temperature of about 85° C.

TONE® 1278 is a polycaprolactone polyol with a softening range of 50 to 60° C.

DEGALAN® 4889F is an acrylic polymer on the basis of methyl methacrylate and n-butyl methacrylate with a softening temperature of about 110° C.

DYNACOLL® 7330 AC 28 is a carboxy-terminated polyester polyol with a softening temperature of about 84° C.

DYNACOLL® 7381 AC 28 is a carboxy-terminated polyester polyol with a softening temperature of about 67° C.

As can be seen from Table 1, the epoxy adhesive compositions of the present invention have relatively low basic viscosities.

TABLE 2

Table 2 shows the softening temperatures of several adhesive samples in °C. determined by DSC (Mettler, Toledo) at a heating rate of 10 K/minute.

| Sample | Softening temperature |
| --- | --- |
| BM 1460.005 (5% DYNACOLL ® 7381) | 53 |
| BM 1460.010 (10% DYNACOLL ® 7381) | 52 |
| BM 1460.014 (5% DYNACOLL ® 7330) | 66 |
| BM 1460.025 (5% DYNACOLL ® 7330 AC 28) | 60 |
| BM 1460.026 (5% DYNACOLL ® 7381 AC 28) | 60 |
| BM 1460.029 | 59 |
| BM 1460.002 (10% Tone 4000, TONE ® 1278) | 39 |

TABLE 3

Except for BM 1480.086 and BM 1480.074, the oscillation test was carried out on a Bohlin rheometer at room temperature after exposing the samples to 60° C. for 15 minutes, at a shear strain of 0.001 and a frequency of 10 Hz.

| Sample | Viscosity [Pas] |
| --- | --- |
| BM 1460.005 (5% DYNACOLL ® 7381) | 19500 |
| BM 1460.010 (10% DYNACOLL ® 7381) | 53000 |
| BM 1460.011 (5% DYNACOLL ® 7330) | 22000 |
| BM 1460.014 (5% DYNACOLL ® 7330) | 23000 |
| BM 1460.025 (5% DYNACOLL ® 7330 AC 28) | 32000 |
| BM 1460.026 (5% DYNACOLL ® 7381 AC 28) | 56000 |
| BM 1460.029 | 29000 |
| BM 1460.002 (10% TONE ® 1278) | 1300/4000 after 1 day at room temperature |
| BM 1480.086 (3% DEGALAN ® 4899F) | 7500 after 2 min. at 120° C. |
| BM 1480.074 (5% DEGALAN ® 4899F) | 17000 after 2 min. at 120° C. |
| BM 1480 (comparative) | |
| not gelled | 5000 |
| gelled (12 min. at 120° C.) | 14500 |
| BM 1496V (comparative) | |
| not gelled | 6500 |
| gelled (12 min. at 120° C.) | 19500 |

As shown in Table 3, the epoxy adhesive compositions of the present invention have a high viscosity of more than 19,000 Pas at low shear strains similar to the pregelled BM 1496V. There is no significant solidification after cooling down from a typical application temperature for the comparative examples.

TABLE 4

Reversibility of the solidification was tested for BM 1460.005 after exposing it several times to room temperature and 60° C. in intervals of 15 min. The measurement of the viscosity under oscillation was carried out as described under Table 3.

| | Initial values | 1 × 15'/ 60° C.- room temp. | 2 × 15'/ 60° C.- room temp. | 3 × 15'/ 60° C.- room temp. | 4 × 15'/ 60° C.- room temp. | 5 × 15'/ 60° C.- room temp. |
| --- | --- | --- | --- | --- | --- | --- |
| Viscosity, [Pas] (Casson, 45° C.) | 81 | 49 | 51 | 52 | 54 | 58 |
| Yield stress, [Pa] (Casson, 45° C.) | 400 | 275 | 274 | 278 | 267 | 270 |
| Viscosity [Pas] (oscillation, 23° C.) | 8000 | 20000 | 18000 | 18000 | 14000 | 18000 |

As can be seen from Table 4, the viscosity at low shear strain remains practically constant at a value of about 18,000 Pas.

TABLE 5

For the samples below, the lap shear strength on different substrates were measured. The values are given in [MPa]

| Sample | CRS 1403, 1.5 mm | Hot dipped steel, 0.8 mm | Al 6130, 1.3 mm |
| --- | --- | --- | --- |
| BM 1460.005 (5% DYNACOLL ® 7381) | 26 | 21 | 20 |
| BM 1460.010 (10% DYNACOLL ® 7381) | 26 | 20 | 20 |
| BM 1460.014 (5% DYNACOLL ® 7330) | 33 | 23 | 21 |
| BM 1460.025 (5% DYNACOLL ® 7330 AC 28) | 29 | 23 | 24 |
| BM 1460.026 (5% DYNACOLL ® 7381 AC 28) | 29 | 23 | 23 |
| BM 1460.029 | 28 | 22 | 24 |
| BM 1480.086 (3% DEGALAN ® 4899F) | 22 | — | — |
| BM 1480 (comparative) | 30 | 22 | 20 |
| BM 1496V (comparative) | 32 | 22 | 20 |

As can be seen from Table 5, the lap shear strength of the samples according to the present invention is comparable to the lap shear strength measured for the comparative examples.

TABLE 6

BM 1460.014 was applied to two different substrates and subjected to aging tests known to a skilled person. The measured lap shear strength values are given in [MPa].

| Aging test | Hot dipped steel, 0.8 mm | Al 6130, 1.3 mm |
| --- | --- | --- |
| unaged | 21 | 20 |
| 1000 h salt spray (according to DIN 50 021) | 20 | 18 |
| 10 cycles VDA (according to VDA 621-415) | 21 | 20 |

TABLE 7

Table 7 shows the impact peel strength [N/mm] for different samples, measured on CRS 1403 (1.0 mm) at room temperature

| Sample | room temperature |
| --- | --- |
| BM 1460.005 (5% DYNACOLL ® 7381) | 36 |
| BM 1460.010 (10% DYNACOLL ® 7381) | 37 |
| BM 1460.014 (5% DYNACOLL ® 7330) | 42 |
| BM 1460.025 (5% DYNACOLL ® 7330 AC 28) | 44 |
| BM 1460.026 (5% DYNACOLL ® 7381 AC 28) | 48 |
| BM 1460.029 | 49 |
| BM 1480.086 (3% DEGALAN ® 4899F) | 39 |
| BM 1480 (comparative) | 38 |
| BM 1496V (comparative) | 44 |

As can be seen from Table 7, the impact peel strength of the samples according to the present invention are comparable to the impact peel strength measured for the comparative examples (BM 1480 and BM 1496V). The impact peel strength at −40° C. (not shown) of the samples according to the present invention are also comparable to the one of the comparative examples.

The invention claimed is:

1. An epoxy adhesive composition comprising
   a) a first epoxy resin,
   b) a second epoxy resin modified with a copolymer based on a 1,3-diene and a polar, ethylenically unsaturated comonomer,
   c) a toughener selected from the group consisting of compounds of formula I

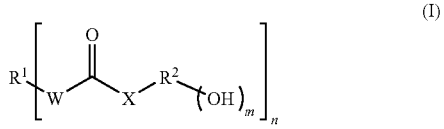

(I)

wherein m is 1 or 2, n is 2 to 6, $R^1$ is an n-valent radical of an elastomeric prepolymer after the removal of the terminal isocyanate, amino or hydroxyl group, the elastomeric prepolymer being soluble or dispersible in epoxy resin, W and X are independently —O— or —$NR^3$—, at least one of W and X being —$NR^3$—, $R^2$ is an m+1-valent radical of a polyphenol or aminophenol after the removal of the phenolic hydroxyl group and optionally of the amino group, and $R^3$ is hydrogen, a $C_1$ to $C_6$ alkyl or phenol,
and compounds of formula II

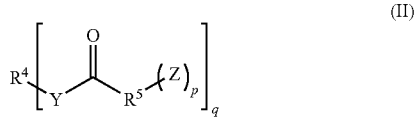

(II)

wherein p is 1 or 2, q is 2 to 6, Y is —O—, —S— or —$NR^6$—, Z is a radical selected from the group consisting of —OH, —$NHR^6$, —OCN,

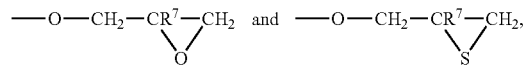

$R^4$ is a residue of a hydroxyl-, mercapto- or amino-terminated polyether prepolymer or of a hydroxyl-, mercapto- or amino-terminated prepolymeric, segmented polyester, polythioester or polyamide $R^5$ is a carbocyclic aromatic or aralphatic p+1-valent radical with groups Z bonded directly to the aromatic ring, $R^6$ is hydrogen, $C_1$ to $C_6$ alkyl or phenyl, and $R^7$ is methyl or hydrogen, and mixtures thereof and
   d) a polymer comprising a polyester segment, said polymer being at least partially crystalline at room temperature and having a softening temperature in the range of 40° to 125° C.

2. A composition according to claim 1, wherein component d) comprises a polyester.

3. A composition according to claim 1 comprising 5 to 15 weight percent of component d).

4. A composition according to claim 2 wherein component d) comprises at least one polymer selected from the group consisting of a hydroxyl-group terminated polyester, a carboxyl-group terminated polyester and an epoxy polyester resin.

5. A composition according to claim 1 wherein component d) has a softening temperature in the range of 40° to 90° C.

6. A composition according to claim 1 wherein component d) has a molecular weight in the range of 2,000 to 5,000 g/mol, preferably in the range of 3,000 to 4,000 g/mol, most preferably of about 3,500 g/mol.

7. A composition according to claim 1 wherein component a) comprises a mixture of at least two different epoxy resins.

8. A composition according to claim 1 wherein component a) comprises at least one epoxy resin which is solid at room temperature.

9. A composition according to claim 1 comprising 10 to 20 weight percent of component b).

10. A composition according to claim 1 wherein component b) comprises an epoxy resin modified with an acrylonitrile-butadiene rubber.

11. A composition according to claim 1 wherein component b) comprises at least one of the acrylonitrile-butadiene rubbers selected from the group of:
   $b_1$) comprising about 10 weight percent of acrylonitrile,
   $b_2$) comprising about 17 weight percent of acrylonitrile, and
   $b_3$) comprising about 26 weight percent of acrylonitrile, or a mixture thereof.

12. A composition according to claim 1 comprising 10 to 20 weight percent of component c).

13. A composition according to claim 1 comprising a gelling agent.

14. A vehicle, parts of which are bonded by the epoxy adhesive composition according to claim 1.

* * * * *